(12) United States Patent
Stevens et al.

(10) Patent No.: US 9,136,550 B2
(45) Date of Patent: Sep. 15, 2015

(54) INTERPENETRATING NETWORK OF ANION-EXCHANGE POLYMERS, PRODUCTION METHOD THEREOF AND USE OF SAME

(75) Inventors: Philippe Stevens, Noisy Rudignon (FR);
Fouad Ghamouss, Rueil Malmaison (FR); Odile Fichet, Poissy (FR);
Christian Sarrazin, Verriere le Buisson (FR)

(73) Assignees: Electricite De France, Paris (FR);
Universite De Cergy Pontoise, Cergy Pontoise Cedex (FR)

( * ) Notice: Subject to any disclaimer, the term of this patent is extended or adjusted under 35 U.S.C. 154(b) by 728 days.

(21) Appl. No.: 13/318,497

(22) PCT Filed: May 4, 2010

(86) PCT No.: PCT/FR2010/050846
§ 371 (c)(1),
(2), (4) Date: Nov. 2, 2011

(87) PCT Pub. No.: WO2010/128242
PCT Pub. Date: Nov. 11, 2010

(65) Prior Publication Data
US 2012/0058413 A1   Mar. 8, 2012

(30) Foreign Application Priority Data
May 6, 2009   (FR) ...................................... 09 53021

(51) Int. Cl.
*H01M 4/86* (2006.01)
*H01M 8/08* (2006.01)
(Continued)

(52) U.S. Cl.
CPC ................ *H01M 8/083* (2013.01); *C08J 3/246* (2013.01); *C08J 5/2275* (2013.01); *C08L 71/03* (2013.01);
(Continued)

(58) Field of Classification Search
CPC ..... C08L 75/04; C08L 2666/02; C08L 65/00; C08L 71/12; H05K 3/4676; H01M 2300/0082; C08G 65/485; C08G 59/40; C08G 18/4829
USPC .................................................. 429/482, 530
See application file for complete search history.

(56) References Cited

U.S. PATENT DOCUMENTS

2006/0029811 A1* 2/2006 Sugioka et al. ................ 428/413
2007/0202375 A1* 8/2007 Jung et al. ........................ 429/33
2012/0010329 A1* 1/2012 Hunter et al. .................. 523/457

FOREIGN PATENT DOCUMENTS

WO   WO 2006/016068   2/2006

OTHER PUBLICATIONS

PCT International Preliminary Report and Written Opinion dated Nov. 2, 2011 received in PCT/FR2010/050846.
(Continued)

*Primary Examiner* — Cynthia H Kelly
*Assistant Examiner* — Monique Wills
(74) *Attorney, Agent, or Firm* — Vedder Price P.C.; Thomas J. Kowalski; Rebecca G. Rudich

(57) ABSTRACT

The invention relates to a method for producing an anion-exchange polymer material having an IPN or semi-IPN structure, said method consisting in: (A) preparing a homogeneous reaction solution containing, in a suitable organic solvent, (a) at least one organic polymer bearing reactive halogen groups, (b) at least one tertiary diamine, (c) at least one monomer comprising an ethylenic unsaturation polymerizable by free radical polymerization, (d) optionally at least one cross-linking agent including at least two ethylenic unsaturations polymerizable by free radical polymerization, and e) at least one free radical polymerization initiator; and (B) heating the prepared solution to a temperature and for a duration that are sufficient to allow both a nucleophilic substitution reaction between components (a) and (b) and a free radical copolymerization reaction of components (c) and optionally (d) initiated by component (e). The invention also relates to the resulting IPN or semi-IPN material and to the use thereof in electrochemical devices, in direct contact with an air electrode.

12 Claims, 3 Drawing Sheets

(51) Int. Cl.
*C08J 3/24* (2006.01)
*C08J 5/22* (2006.01)
*C08L 71/03* (2006.01)
*H01M 12/06* (2006.01)

(52) U.S. Cl.
CPC .......... *H01M 12/06* (2013.01); *C08J 2300/208* (2013.01); *H01M 2300/0082* (2013.01); *Y02E 60/50* (2013.01)

(56) References Cited

OTHER PUBLICATIONS

PCT International Search Report received in PCT/FR2010/050846.
McLean et al., "An assessment of alkaline fuel cell technology", *International Journal of Hydrogen Energy*, vol. 27, pp. 507-526 (2002).
Han et al. "Polyepichlorohydrin Polyurethane/Poly(methyl methacrylate) Interpenetrating Polymer Networks", *Polymers for Advanced Technologies*, vol. 7, pp. 315-322 (1996).

* cited by examiner

INTERPENETRATING NETWORK OF ANION-EXCHANGE POLYMERS, PRODUCTION METHOD THEREOF AND USE OF SAME

RELATED APPLICATIONS

The present application is filed pursuant to 35 U.S.C. §371 as a U.S. National Phase application of International Patent Application No. PCT/FR2010/050846, which was filed on May 4, 2010, claiming the benefit of priority to French Patent Application No. FR 0953021 filed on May 6, 2009. The entire content of each of the aforementioned applications is incorporated herein by reference in its entirety.

The present invention relates to a method for producing an anion-exchange polymer material having an interpenetrating polymer network (IPN) or semi-interpenetrating polymer network (semi-IPN) structure, to the polymer material obtained by means of this method and to the use thereof in electrochemical devices, in contact with an air electrode.

For decades, many studies have been carried out in order to develop and optimize air electrodes that make it possible to produce electrochemical generators of metal-air type, which are known for their high energies by weight, that can reach several hundred Wh/kg.

Air electrodes are also used in alkaline fuel cells which are particularly advantageous compared with other systems owing to the high reaction kinetics at the electrodes.

An air electrode makes it possible to use, as oxidizing agent for the electrochemical reaction, air from the atmosphere, which is available in unlimited amount anywhere and at any time.

An air electrode is a porous solid structure in contact with the liquid electrolyte, which is generally an alkaline solution. The interface between the air electrode and the liquid electrolyte is a "triple contact" interface where the active solid material of the electrode, the oxidizing gas (air) and the liquid electrolyte are simultaneously present. This triple contact interface has always posed numerous difficulties linked in particular to the gradual degradation, even when not operating, of the air electrode, in particular when the liquid electrolyte is a concentrated alkaline solution, such as a several times molar solution of sodium hydroxide, potassium hydroxide or lithium hydroxide.

The drawbacks of air electrodes in alkaline fuel cells are set out, for example, in the literature article by G. F. McLean et al., entitled "An assessment of alkaline fuel cell technology", *International Journal of Hydrogen Energy* 27(2002), 507-526:
- these electrodes undergo gradual wetting of their porous structures until flooding thereof which makes them ineffective. This change is accelerated during operation of the fuel cell or of the battery;
- in the long term, the carbon dioxide present in the air diffuses toward and dissolves in the alkaline solution forming the electrolyte, in the form of a carbonate anion which precipitates in the presence of alkaline cations (Na, K, Li). A gradual and inevitable carbonation of the electrolyte is thus observed;
- carbonates form mainly at the liquid/porous solid interface and promote the flooding phenomenon mentioned above;
- the carbonate precipitation gradually destroys the structure of the air electrode and considerably reduces the charge transfer kinetics at the triple point, which ends up making the electrode ineffective.

The objective of the present invention was to develop anion-conducting cationic polymer materials capable of being interposed between the air electrode and the liquid alkaline electrolyte or else of replacing the latter, in order to substantially reduce, or even eliminate, the carbonation of the solid electrolyte and the degradation of the air electrode which results therefrom.

Such materials should be usable in alkaline fuel cells and metal-air batteries, either as a solid electrolyte, or as membrane separating the air electrode from the alkaline liquid electrolyte.

The applicant has proposed, in international application WO 2006/016068, a crosslinked organic polymer material, in particular as anion-conducting solid electrolyte in alkaline fuel cells. The polymer material described in this application is obtained by a nucleophilic substitution between a halogenated linear polymer, such as polyepichlorohydrin, and a combination of at least one tertiary diamine and of at least one tertiary or secondary monoamine. The reaction between the tertiary amine functions and the chlorinated functions of the polymer results in the formation of quaternary ammonium functions responsible for the anion-conducting power of the polymer material obtained. Moreover, the reaction of the two tertiary amine functions of the bifunctional reactant (tertiary diamine) results in the crosslinking of the polymer and in the formation of an insoluble three-dimensional network.

However, this crosslinked anion-conducting material based on polyepichlorohydrin comprising quaternary ammonium groups is not stable in concentrated alkaline solutions. Moreover, it is not self-supported and, in order to obtain it in the form of a large membrane that can be handled, it is necessary to synthesize it on a support or in a porous or fibrous structure, for example a nonwoven textile made of polypropylene.

The applicant, in the context of its research aimed at developing improved anion-conducting organic materials capable of being used in fuel cells or batteries in order to reduce the degradation of air electrodes, has discovered that it is possible to overcome the drawbacks described above, by incorporating a polymeric system as described in WO 2006/016068 into an interpenetrating polymer network (IPN) or a semi-interpenetrating polymer network (semi-IPN).

An interpenetrating polymer network (IPN) is a polymeric system comprising at least two networks of polymers of which at least one has been synthesized in the presence of the other, without, however, being linked to one another by covalent bonds, and which cannot be separated from one another without breaking chemical bonds (*IUPAC Compendium of Chemical Terminology*, 2nd edition, 1997).

A semi-interpenetrating polymer network (semi-IPN) differs from an IPN by virtue of the fact that one of the at least two polymers present does not form a three-dimensional network, i.e. is not crosslinked, but is a linear or branched polymer. Owing to the absence of crosslinking of the second polymeric system, the latter can be separated from the first by extraction.

Consequently, a subject of the present invention is a method for producing an anion-exchange polymer material having an interpenetrating polymer network (IPN) or semi-interpenetrating polymer network (semi-IPN) structure, said method comprising the following successive steps:

(A) preparing a homogeneous reaction solution comprising, in a suitable organic solvent,
(a) at least one organic polymer bearing reactive halogenated groups,
(b) at least one tertiary diamine, (c) at least one monomer comprising an ethylenic unsaturation polymerizable by free-radical polymerization, and (d) optionally, at least one crosslinking agent comprising at least two ethylenic unsaturations polymerizable by free-radical polymerization, and (e) at least one free-radical polymerization initiator, (B) heating the solution prepared in step (A) to a temperature and for a duration that are sufficient to allow both a nucleophilic substitution reaction between components (a) and (b) and a free-radical copolymerization reaction of components (c) and optionally (d), initiated by component (e).

The method of the present invention thus comprises the simultaneous carrying out of two reactions which do not interfere with one another:

a nucleophilic substitution reaction between the halogenated organic polymer and the tertiary diamine, resulting in the formation of an insoluble, crosslinked, three-dimensional polymer network bearing quaternary ammonium groups, and a free-radical polymerization reaction of the monomers and optionally of the crosslinking agent, initiated by the free-radical initiator, and which results in the formation of a second polymer network intermingled with the first. When the system contains a sufficient amount of a crosslinking agent (d), this second polymer network is three-dimensional, crosslinked and insoluble.

Figure 1:
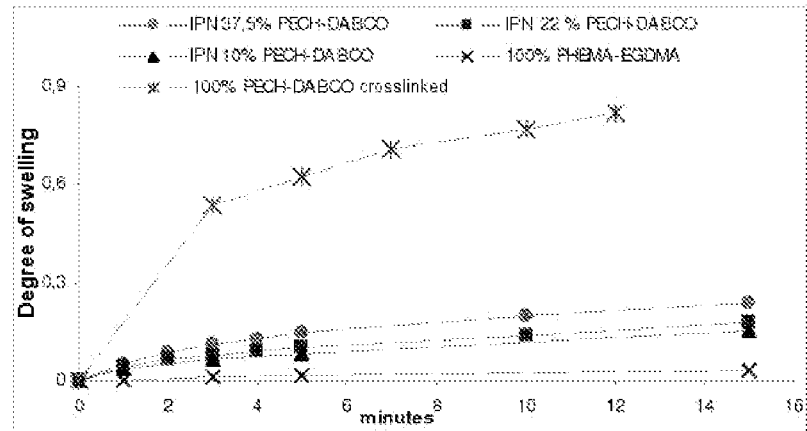
FIG. 1 is a graph illustrating the degree of swelling in water as a function of time.

In one preferred embodiment of the invention, the reaction mixture contains a crosslinking agent (d) and the polymer network formed is an IPN and not a semi-IPN.

The halogenated organic polymer can be chosen from all homopolymers and copolymers comprising halogenated functions which are reactive with respect to the tertiary amine functions of the diamine. The halogenated functions are preferably chlorinated or brominated groups, in particular $C_{1-6}$ chloroalkyl or $C_{1-6}$ bromoalkyl groups.

Moreover, the organic polymer bearing reactive halogenated groups is preferably chosen from homopolymers and copolymers with a polyether backbone. By way of examples of polymers that are particularly preferred, mention may be made of epichlorohydrin homopolymers and epichlorohydrin/ethylene oxide copolymers.

By way of example of a tertiary diamine (component (b)), mention may be made of tetramethylenediamine, 1,4-diazobicyclo[2,2,2]octane (DABCO), N-methylimidazole, bipyridine, diimidazoline and mixtures thereof. The tertiary diamine serves both to crosslink the halogenated organic polymer and to introduce positive charges essential for the anionic conduction of the polymer material prepared. Indeed, each tertiary amine function will be converted, after reaction with a chlorinated function, to a quaternary ammonium.

Although the method claimed envisions explicitly the reaction between the halogenated polymer and a tertiary diamine, it also encompasses a variant wherein the halogenated polymer has been premodified by attachment of the diamine, leaving the second amine function free for a subsequent crosslinking reaction.

The presence of the tertiary diamine is essential for the formation of a crosslinked three-dimensional network. In order to obtain a satisfactory degree of crosslinking, the diamine/halogenated organic groups molar ratio is generally between 1% and 80%, preferably between 2 and 40% and in particular between 10 and 30%.

It may be useful to introduce into the starting reaction solution (A), in addition to the tertiary diamine essential for crosslinking, a tertiary monoamine (component b')). The reaction of the latter with the halogenated organic polymer makes it possible to increase the charge density of the cationic network and therefore its anionic conductivity, without however modifying the crosslinking density.

By way of examples of tertiary monoamines that can be used in the present invention, mention may be made of triethanolamine, quinuclidine, quinuclidinol and mixtures thereof.

Component (c) of the reaction mixture prepared in step (A) can in principle be any monoethylenic monomer polymerizable by free-radical polymerization, provided that it does not interfere with the nucleophilic substitution reaction of components (a) and (b). Thus, monochlorinated or polychlorinated vinyl monomers, such as vinyl chloride or vinylidene chloride, are unsuitable as component (c) since they could participate in a nucleophilic substitution reaction with the tertiary diamine and thus result in the formation of covalent bonds between the two IPN or semi-IPN networks.

The monomers (c) are preferably uncharged or bear a cationic charge. The use of comonomers bearing an anionic charge (such as (meth)acrylic acid or styrene-sulfonate) will in fact probably disrupt the ionic conduction behavior of the final material obtained and is consequently advised against.

By way of examples of monomers that can be used as component (c), mention may be made of the following monomers:

$C_{1-10}$ Alkyl acrylates and methacrylates, $C_{1-10}$ hydroxyalkyl acrylates and methacrylates, styrene and its derivatives, polyethylene glycol acrylates and methacrylates, vinyl acetate, N-vinylpyrrolidone, acrylonitrile, (vinylbenzyl)tri($C_{1-6}$ alkyl)ammonium chloride or bromide, tri($C_{1-6}$ alkyl) vinyloxycarbonylalkylammonium chloride or bromide, and allyloxy-carbonyl($C_{1-6}$ alkyl)tri($C_{1-6}$ alkyl)ammonium chloride or bromide.

Among these, $C_{1-4}$ alkyl methacrylates, polyethylene glycol methacrylates, $C_{1-4}$ hydroxyalkyl methacrylates and vinyl acetate are particularly preferred.

The crosslinking agent (component (d)) comprising at least two ethylenic unsaturations is optional in the case of a semi-IPN, but necessarily present when it is desired to prepare an IPN. It is chosen, for example, from the group made up of divinylbenzene, ethylene glycol di(meth)acrylate, poly(ethylene oxide) glycol di(meth)acrylate and bisphenol A di(meth)acrylate. The notation "(meth)acrylate" used herein encompasses acrylates, methacrylates and combinations of both.

When it is present, the crosslinking agent is preferably used in a proportion of from 0.5 to 10% by weight, preferably 0.5 to 5% by weight, relative to the monounsaturated ethylenic monomer (component (c)).

In one variant of the method of the invention, the polymerizable monomer (component (c))+crosslinking agent (component (d)) system can be replaced with a component, subsequently referred to as component (cd), which plays the role of components (c) and (d). Said component (cd) is a polymer, preferably having a number-average molecular weight of between 300 and 4000, comprising, preferably at each of its ends, a double bond polymerizable by free-radical polymerization. When such a polymer comprising polymerizable double bonds is placed in the presence of a free-radical initiator, the double bonds polymerize and result in the crosslinking of the polymer and in the formation of a three-dimensional network. The more or less loose nature of this network depends on the molecular weight of the polymer. The higher said molecular weight, the less crosslinked the network obtained will be.

A subject of the present invention is consequently also a method as described above, in which components (c) and (d), in step (A), are replaced with or combined with an organic polymer comprising at least two groups comprising a polymerizable double bond (component (cd)), preferably located at the end of the organic polymer.

By way of example of such a component (cd), mention may be made of polyethylene glycol dimethacrylate.

Any compound capable of decomposing under the effect of heat and/or of light, to give free radicals that are sufficiently stable to initiate the polymerization reaction, can in principle be used as initiator (component (e)). Such initiators are known by those skilled in the art. Thermal initiators such as peroxides, diazo compounds or persulfates will preferably be used. By way of example of such thermal initiators, mention may be made of ammonium persulfate, hydrogen peroxide, benzoyl peroxide (BPO), azobisisobutyronitrile (AIBN) and dicyclohexyl peroxycarbonate (DHPC).

Among the latter, BPO and AIBN are particularly suitable at the temperatures used.

When the initiator is a photoinitiator, the polymerization is carried out under radiation of suitable wavelength and intensity.

The initiator is preferably used in an amount of between 0.1 and 10% by weight, preferably between 1 and 5% by weight, relative to the total weight of components (c) and (d).

By way of example of an organic solvent suitable for preparing the initial reaction solution containing components (a)-(e), mention may be made of dimethylformamide, ethanol, dimethyl sulfoxide, methanol, acetone, butanol, butanone or a mixture of these solvents.

In order to obtain, at the end of step (B), polymer materials having a suitable consistency, the initial reaction solution preferably has an overall concentration of components (a)-(e) of between 10 and 80% by weight; in other words, the proportion of the organic solvent in the initial solution is preferably between 90 and 20% by weight.

The weight ratio of components (a) and (b), including (b'), forming the first three-dimensional network bearing cationic charges, to components (c)-(e) forming the second three-dimensional network, which is preferably uncharged, can vary between very broad limits, on the condition that the final material has a conductivity which is sufficient for the envisioned application.

Generally, the weight ratio of the components forming the cationic first polymer network, to the components forming the second polymer network, is between 90/10 and 10/90, preferably between 80/20 and 15/85, and in particular between 60/40 and 25/75.

During step (B) of the method of the invention, the homogeneous reaction solution containing all of the reactants (a)-(e), including optionally the monofunctional amine (component b'), is heated to a temperature sufficient to trigger both the nucleophilic substitution reaction between components (a) and (b) and (b') optionally present, and the decomposition of the polymerization initiator. The two reactions thus preferably take place in parallel and simultaneously and result in the formation of an IPN or semi-IPN material having a uniform composition, consisting respectively of two mutually interpenetrating polymer networks or of a linear or branched polymer entangled within a crosslinked polymer network.

In one variant, it is possible to envision a system which reacts in two steps, the formation of one of the two networks being activated at a temperature below the temperature of activation of the other polymer network.

The heating temperature of step (B) is preferably between 30 and 130° C., in particular between 35 and 100° C. and even more preferentially between 50 and 80° C. This temperature is generally maintained for a duration of between 1 and 24 hours, preferably of between 6 and 16 hours.

As explained in the introduction, the IPN or semi-IPN polymer material obtained at the end of the method according to the invention can be used in an alkaline fuel cell or in a metal-air battery or cell in direct contact with an air electrode, either as a solid electrolyte replacing the liquid alkaline electrolyte, or as an anion-conducting solid separation membrane, inserted between the air electrode and the liquid electrolyte.

In applications where it is important to provide very good adhesion of the IPN or semi-IPN material of the present invention to the air electrode, it may be advantageous to carry out step (B) in the presence of the air electrode. For this, the solution prepared in step (A) is poured as a thin layer over the air electrode so as to preferably completely cover the surface containing the active material thereof, and the whole is subjected to heating step (B). In this embodiment, the solution can penetrate, to a small depth (generally at most equal to 5% of the total thickness of the electrode), into the porous structure of the electrode and polymerize/crosslink in situ, thus establishing a strong bond between the final crosslinked polymer material and the electrode.

Such a composite air electrode, made up of a known air electrode and an anion-conducting IPN or semi-IPN material polymerized in situ at the surface of the air electrode, is also a subject of the present invention. This composite electrode is characterized in that the IPN or semi-IPN material extends into a part of the porous network of the air electrode, penetrating this porous network to a depth at most equal to 5%, preferably at most equal to 2% of the total depth of the air electrode.

However, it is also possible to carry out step (B) in the absence of the air electrode, for example by maintaining the solution being two nonporous support plates or by casting followed by evaporation. The applicant has noted that the fine membrane obtained at the end of step (B) can then be handled without problems and be stuck directly and easily onto the air electrode, without the use of an adhesive (i.e. without a membrane solution), by simply applying a pressure.

To the knowledge of the applicant, the material obtained at the end of the method described above has up until now never been synthesized or proposed as an anion-conducting membrane or solid electrolyte in electrochemical devices. Consequently, a subject of the present invention is also an anion-exchange polymer material having an interpenetrating polymer network (IPN) or semi-interpenetrating polymer network (semi-IPN) structure that can be obtained by means of the method as described above.

This material preferably has a charge density of from 0.3 to 2 meq per gram.

Its intrinsic ionic conductivity is preferably greater than $10^{-6}$ S·cm$^{-1}$, generally between $10^{-6}$ S·cm$^{-1}$ and $10^{-2}$ S·cm$^{-1}$, and in particular between $10^{-4}$ S·cm$^{-1}$ and $5\times10^{-3}$ S·cm$^{-1}$.

It is a relatively hydrophilic material which swells when it is brought into contact with water. The degree of swelling of the material of the present invention is, however, considerably lower than the degree of swelling of a crosslinked polymer material of the prior art, prepared from components (a) and (b/b') only (see example 3 hereinafter). The degree of swelling of the polymer material of the present invention, as defined in example 3 of the present application, is preferably between 10 and 400, in particular between 12 and 300.

A subject of the present invention is also the use of an anion-exchange IPN or semi-IPN material as described above, as a solid electrolyte in an electrochemical device.

As indicated in the introduction, the anion-exchange IPN material of the present invention is particularly useful in alkaline fuel cells (AFCs) using porous air electrodes in contact with the alkaline electrolyte.

In such a fuel cell, the IPN or semi-IPN material of the present invention can either replace the alkaline liquid electrolyte or it can be placed at the air electrode/liquid alkaline electrolyte interface. In the latter case, it effectively prevent or reduces the diffusion of the carbon dioxide contained in the air to the liquid electrolyte and the carbonation thereof. It also reduces, or even eliminates, the risk of flooding of the porous structure of the air electrode by the liquid electrolyte. The lifetime of a fuel cell containing, in place of the liquid electrolyte or in combination therewith, an anion-conducting IPN or semi-IPN material in direct contact with the air electrode is thus considerably increased.

In another embodiment of the present invention, the IPN or semi-IPN material is used in an air-metal cell or battery, in direct contact with the air electrode, in the form of a membrane separating the air electrode from the liquid electrolyte.

It is also possible to envision the use of the IPN or semi-IPN material of the present invention as a replacement for the liquid electrolyte in any alkaline battery, such as NiMH or NiOOH—Zn, NiOOH—Cd, AgO—Zn, etc.

EXAMPLE 1

Preparation of an IPN Material Based on Crosslinked Polyepichlorohydrin and on Crosslinked Poly(Hydroxy-Ethyl Methacrylate)

An ethanolic solution containing 200 g/L of an epichlorohydrin polymer (PECH) grafted beforehand with 12% by weight of 1,4-diazabicyclo[2,2,2]octane (DABCO) is prepared. 0.9 g of hydroxyethyl methacrylate (HEMA), 0.1 g of ethylene glycol dimethacrylate (crosslinking agent) and 0.05 g of azobisisobutyronitrile (AIBN, free-radical initiator) are dissolved in 4 ml of this solution. The solution is degassed under a stream of argon and with stirring for 30 minutes at ambient temperature. The solution is then placed in a mold made up of two glass plates (5 cm×5 cm) separated by a Teflon® seal 1 mm thick. The filled mold is placed in an oven at 60° C. for 16 hours. The IPN membrane obtained after demolding is homogeneous and transparent and has a consistency which allows it to be handled easily.

In the membrane, the weight ratio of the first polymer network (crosslinked PECH) to the second polymer network (crosslinked PHEMA) is 44/56 (=PECH content of 44%).

EXAMPLE 2

IPN membranes are prepared, in the manner described in example 1, by varying the initial proportions of the reactants so as to obtain PECH contents of 10%, 22%, 30% and 37.5% by weight, as are two control membranes containing, respectively, 0% of crosslinked PECH (i.e. containing 100% of poly(hydroxyethyl methacrylate) crosslinked with diethylene glycol dimethacrylate, PHEMA-EGDMA) and 100% of PECH crosslinked with DABCO.

EXAMPLE 3

Determination of the Degree of Swelling in Water of the Membranes as a Function of Immersion Time-Anionic Conductivity The membranes prepared in example 2, containing respectively 0%, 10%, 22%, 37.5% and 100% of crosslinked PECH, are immersed in distilled water at 23° C.

At regular intervals, the membrane is removed from the water in order to determine its weight.

The degree of swelling is calculated according to the formula $$D_s=(w_t-w_0)/w_0$$

The various curves of degree of swelling in water as a function of time are represented in FIG. 1.

It is observed that the degree of swelling in water of the 100% crosslinked PECH control membrane is approximately 75% after about ten minutes, whereas that of all the other membranes is less than 30%. The swelling in water of the 100% crosslinked PECH membrane results in mechanical weakening of the membrane. The membrane cannot be handled and is unusable.

The IPN membranes containing 10%, 22% and 37.5% of PECH and the PHEMA-EGDMA membrane retain their good dimensional and mechanical properties. Their moderate degree of swelling, of about 20 to 25% by weight, provides a suitable amount of water for good anionic conduction.

Figure 2:
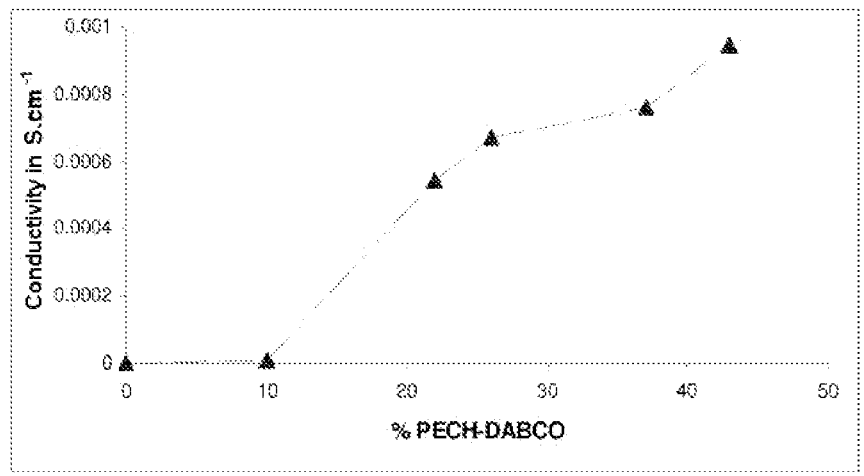
FIG. 2 is a graph representing the anionic conductivity in water, expressed as S/cm, of the membranes of examples 1 and 2 as a function of the percentage of crosslinked PECH.

FIG. 2 represents the anionic conductivity in water, expressed as S/cm, of the membranes of examples 1 and 2 as a function of the percentage of crosslinked PECH. This figure shows that a crosslinked PECH content of less than 20% by weight confers insufficient anionic conductivity on the IPN membrane. However, this threshold can be expected to be all the lower, the higher the DABCO/PECH ratio.

EXAMPLE 4

Production of a Composite Air Electrode by In Situ Polymerization and by Separate Polymerization A membrane having a thickness of 100 μm, prepared in the manner described in example 1, is manually applied to the surface of an air electrode located on the side of the electrolyte. It is noted that the membrane adheres perfectly to the surface of the electrode (composite electrode A).

A degassed homogeneous reaction solution prepared in the manner described in example 1 is deposited at the surface of an identical air electrode. The whole is placed in a thermostated oven at 60° C. for 12 hours. A composite air electrode bearing, at its surface, a deposit of IPN material having a thickness of about 60 μm is obtained (composite electrode B).

EXAMPLE 5

The two composite air electrodes of example 4 are each mounted in a cell containing a solution of LiOH at 2 mol·L$^{-1}$, with an Hg/HgO reference electrode and a stainless steel counter electrode for the electrochemical tests.

Figure 3:
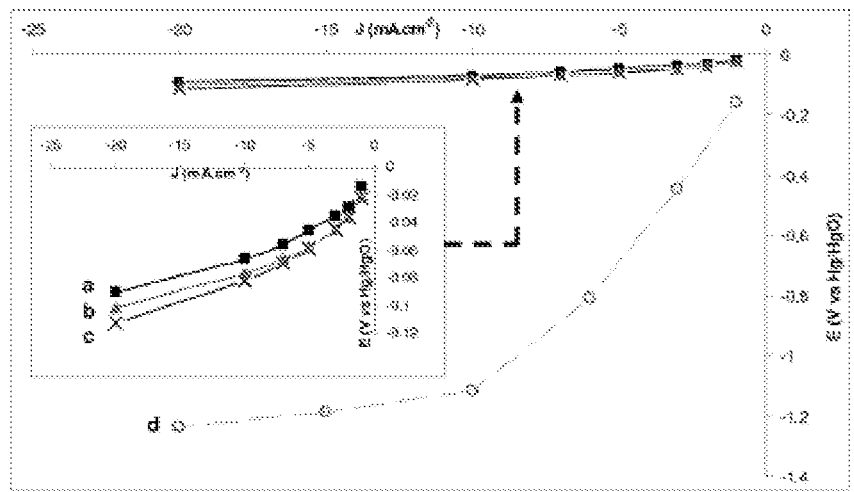
FIG. 3 shows the polarization curves obtained for a cell containing a solution of LiOH at 2 mol·L$^{-1}$ with an Hg/HgO reference electrode and a stainless steel counter electrode.

FIG. 3 shows the polarization curves obtained for such a cell. The curve (a) corresponds to a cell with a nonmodified air electrode, the curve (b) to a cell with a composite electrode B (example 4), the curve (c) to a cell with a composite electrode A (example 4) and the curve (d) to a cell with an electrode covered with a commercial membrane based on a network (non-IPN) of crosslinked PECH incorporated into an inert porous structure made of polypropylene (membrane sold by the company ERAS LABO).

It is noted that the polarization of the air electrode modified with the commercial membrane is very high and exceeds $-1V$ for a current density of only $-10$ mA·cm$^{-2}$. The use of such a membrane under the conditions described above, i.e. brought directly into contact with the air electrode in the absence of a membrane solution, is therefore impossible. Conversely, the polarizations noted for the composite air electrodes according to the present invention (curves (b) and (c)) are advantageously almost identical to that of the naked air electrode. The addition of these membranes to the electrode does not therefore induce any significant drop in potential in the device at these current densities. The ionic contact between the IPN membranes and the air electrode is satisfactory in the absence of any membrane solution.

EXAMPLE 6

Stability of the Air Electrodes in an Alkaline Medium

Electrochemical test devices are prepared with
(i) a nonmodified (naked) air electrode;
(ii) an air electrode according to the invention modified with an IPN (composite electrode A of example 4);
(iii) a comparative air electrode, modified with a 100% PECH-DABCO membrane.

The 100% PECH-DABCO membrane (thickness 100 µm) is prepared by heating a solution of PECH-DABCO (100 g/L in an ethanol/butanone mixture (80/20)) for 12 hours at 60° C.

The polarization measurements are carried out relative to an Hg/HgO electrode with a current density of $-10$ mA·cm$^{-2}$. Before the beginning of the discharge, the modified electrodes are equilibrated for 2 hours in the electrochemical cell previously described containing LiOH at 2 mol·L$^{-1}$.

Figure 4:
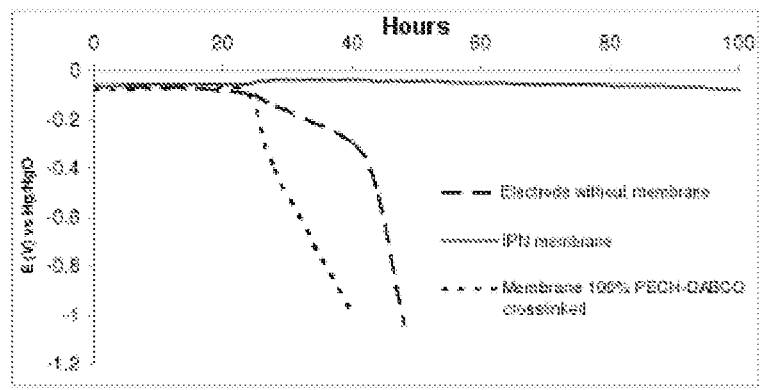
FIG. 4 illustrates the change in polarization during discharge of air electrodes.

FIG. 4 shows the change in polarization during discharge of the air electrodes (i), (ii) and (iii) described above.

The air electrode (ii) according to the invention resists for more than 100 hours during discharge in lithium hydroxide, whereas the lifetime of the two comparative electrodes (i) and (iii) does not exceed 20 to 30 hours.

Similar results are obtained with a saturated solution of lithium hydroxide.

EXAMPLE 7

Synthesis of an IPN Membrane According to the Invention Combining a Crosslinked PECH Network and a Network Based on a Component (cd)

0.95 g of polyethylene glycol dimethacrylate (PEGDMA, Mn=750 g/mol$^{-1}$) and 0.047 g of AIBN are dissolved in 4 ml of a solution of polyepichlorohydrin modified with 12% of DABCO (100 g/L$^{-1}$). The solution is degassed under a stream of argon and with stirring for 30 minutes at ambient temperature. The solution is then placed in a mold made up of two glass plates (5 cm×5 cm) separated by a Teflon® seal 1 mm thick. The filled mold is placed in an oven at 60° C. for 16 hours. The IPN membrane obtained after molding is homogeneous and transparent and can be easily handled.

The PEGDMA/crosslinked PECH weight ratio of the IPN material is 71/29.

Figure 5:
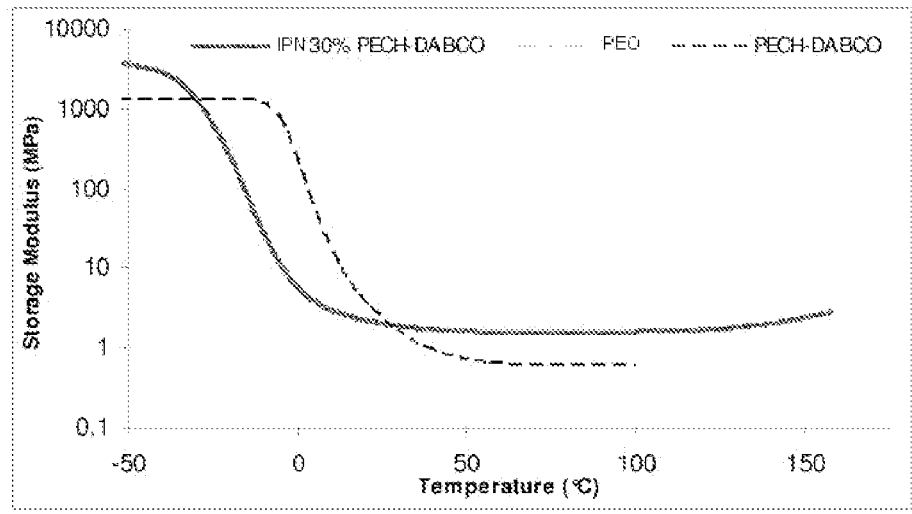
FIG. 5 illustrates the change in storage moduli of the IPN membrane and of the corresponding simple networks.
Figure 6:
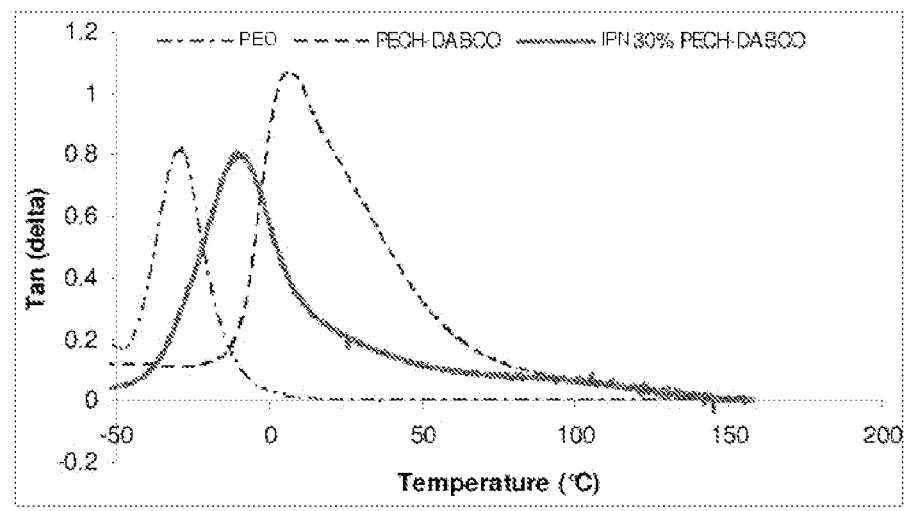
FIG. 6 illustrates the corresponding loss modulus/storage modulus as a function of temperature.

The results of the dynamic thermomechanical analysis of the resulting IPN material are represented
in FIG. 5, which shows the change in storage moduli of the IPN membrane and of the corresponding simple networks (synthesized separately), and
in FIG. 6, which gives the corresponding tan δ curves (tan δ=loss modulus/storage modulus) as a function of temperature.

A single mechanical relaxation is observed for the IPN membrane. The modulus of the rubbery plateau in the IPN (1.5 MPa) is very close to that of the simple crosslinked PECH network (0.6 MPa). Thus, the PECH network forms a continuous phase in the IPN membrane, which is in agreement with the quite high value of the anionic conductivity, measured for this membrane as being equal to $10^{-3}$ S·cm$^{-1}$ at ambient temperature.

It can be deduced from the thermomechanical analysis results that the PEGDMA and PECH networks interpenetrate correctly, since the curve of tan δ as a function of temperature exhibits a single mechanical relaxation, characterized by a single intermediate peak positioned between the two peaks observed for each of the corresponding simple networks.

EXAMPLE 8

A series of IPN networks based on crosslinked PECH and on polyethylene glycol dimethacrylate (PEGDMA–Mn=750 g·mol$^{-1}$) is prepared, in the manner described in example 7, by varying the crosslinked PECH content from 10 to 29% by weight (=90 to 71% of PEGDMA).

All these membranes have a satisfactory mechanical strength which makes it possible to handle them easily, and it is possible to position them on the electrode according to example 4 (composite electrode A). However, this assembly exhibits a very high polarization. In order to decrease this polarization, it is necessary to use a membrane solution placed between the electrode and the IPN membrane. A study of the stability of composite electrode A thus prepared, similar to that described in example 6, shows that this composite electrode A has a stability curve identical to that of an electrode modified with a 100% PECH-DABCO membrane ((iii) in example 6).

EXAMPLE 9

Influence of the Molecular Weight of the Component (Cd)

IPN membranes are prepared, in the manner described in example 8, using, in place of the PEGDMA of M$_n$ equal to 750 g·mol$^{-1}$, a PEGDMA of M$_n$ equal to 330 g·mol$^{-1}$ and to 550 g·mol$^{-1}$. The decrease in molar mass of the PEGDMA makes it possible to increase the density of crosslinking of the corresponding network. The membranes are then more rigid and their degree of swelling in lithium hydroxide decreases. However, these modifications did not make it possible to increase the lifetime of a composite electrode A containing such a membrane.

The invention claimed is:
1. A method for preparing an anion-exchange polymer material having an interpenetrating polymer network (IPN) or semi-interpenetrating polymer network (semi-IPN) structure, said method comprising the following successive steps leading to the formation of the IPN or semi-IPN structure:
   (A) preparing a homogeneous reaction solution comprising, in a suitable organic solvent,
      (a) at least one organic polymer bearing reactive halogenated groups,
      (b) at least one tertiary diamine,

(c) at least one monomer comprising an ethylenic unsaturation polymerizable by free-radical polymerization, and (d) optionally, at least one crosslinking agent comprising at least two ethylenic unsaturations polymerizable by free-radical polymerization, and (e) at least one free-radical polymerization initiator, (B) heating the solution prepared in step (A) to a temperature and for a duration that are sufficient to allow both a nucleophilic substitution reaction between components (a) and (b) and a free-radical copolymerization reaction of components (c) and optionally (d), initiated by component (e).

2. The method as claimed in claim 1, wherein the reaction solution prepared in step (A) also comprises a tertiary mono monoamine (component (b')).

3. The method as claimed in claim 1, wherein the organic polymer bearing reactive halogenated groups is chosen from homopolymers and copolymers with a polyether backbone.

4. The method as claimed in claim 3, wherein the organic polymer bearing reactive halogenated groups is chosen from epichlorohydrin homopolymers and copolymers.

5. The method as claimed in claim 1, wherein the tertiary diamine is chosen from the group consisting of tetramethylenediamine, 1,4-diazobicyclo[2,2,2]octane, N-methylimidazole, bipyridine, diimidazoline and mixtures thereof.

6. The method as claimed in claim 2, wherein the tertiary monoamine is chosen from the group consisting of triethanolamine, quinuclidine, quinuclidinol and mixtures thereof.

7. The method as claimed in claim 1, wherein the heating temperature of step (B) is between 30 and 130° C., preferably between 35 and 100° C. and in particular between 50 and 80° C.

8. The method as claimed in claim 1, wherein the heating duration of step (B) is between 1 and 24 hours, preferably between 6 and 16 hours.

9. The method as claimed in claim 1, wherein the monomer comprising an ethylenic unsaturation is chosen from the group made up of $C_{1-10}$ alkyl acrylates and methacrylates, $C_{1-10}$ hydroxyalkyl acrylates and methacrylates, styrene and its derivatives, polyethylene glycol acrylates and methacrylates, vinyl acetate, N-vinylpyrrolidone, acrylonitrile, (vinylbenzyl)-tri($C_{1-6}$alkyl)ammonium chloride or bromide, tri ($C_{1-6}$ alkyl)vinyloxycarbonylalkylammonium chloride or bromide, and allyloxycarbonyl($C_{1-6}$ alkyl)tri($C_{1-6}$ alkyl)ammonium chloride or bromide.

10. The method as claimed in claim 1, wherein the crosslinking agent comprising at least two ethylenic unsaturations is chosen from divinylbenzene, ethylene glycol di(meth)acrylate, poly(ethylene oxide) glycol di(meth)acrylate and bisphenol A di(meth)acrylate.

11. The method as claimed in claim 1, wherein components (c) and (d) are replaced with or combined with an organic polymer comprising at least two groups comprising a polymerizable double bond (component (cd)), preferably located at the end of the organic polymer.

12. An anion-exchange polymer material having an interpenetrating polymer network (IPN) or semi-interpenetrating polymer network (semi-IPN) structure that can be obtained by means of the method as claimed in claim 1.

* * * * *